United States Patent [19]
Barr et al.

[11] 4,291,992
[45] Sep. 29, 1981

[54] PRINTER PIN CONTROL CIRCUITRY

[75] Inventors: Charles W. Barr, Nashua; Michael I. Lerer, Bedford; Royden C. Sanders, Jr., Wilton; Russell J. Vassar, Jr., Nashua, all of N.H.

[73] Assignee: R. C. Sanders Technology Systems, Inc., Amherst, N.H.

[21] Appl. No.: 41,415

[22] Filed: May 22, 1979

[51] Int. Cl.³ .............................................. B41J 3/12
[52] U.S. Cl. .................. 400/124; 101/93.02; 400/167
[58] Field of Search ............... 400/121, 124, 157.3, 400/166, 167; 361/152, 153; 101/93.02, 93.03, 93.04, 93.05

[56] References Cited

U.S. PATENT DOCUMENTS

| 3,678,847 | 7/1972 | Pear et al. | 101/93.02 |
| 4,041,546 | 8/1977 | Stewart | 361/152 |
| 4,159,882 | 7/1979 | Sanders et al. | 400/124 |
| 4,162,131 | 7/1979 | Carson et al. | 400/124 |
| 4,162,858 | 7/1979 | Brandenburg | 400/124 |

FOREIGN PATENT DOCUMENTS

2238605  2/1974  Fed. Rep. of Germany ... 101/93.02

Primary Examiner—Paul T. Sewell
Attorney, Agent, or Firm—Kenway & Jenney

[57] ABSTRACT

In the printer pin control circuitry described herein, data bits which request the actuation of respective pins are entered, indirectly, into respective digital equivalent shift registers to provide, for each pin, a respective short term history of actuation requests. A high speed, special purpose digital processor sequentially examines the several shift registers to determine, at successive points in time, whether each pin winding should then be energized or not to produce an effective energizing and damping waveform under a variety of sequential actuation conditions.

7 Claims, 8 Drawing Figures

| F7 | F6 | F5 | F4 | F3 | F2 | F1 | F0 | F7 | F6 | F5 | F4 | F3 | F2 | F1 | F0 | F7 | F6 | F5 | F4 | F3 | F2 | F1 | F0 | Addr |
|---|---|---|---|---|---|---|---|---|---|---|---|---|---|---|---|---|---|---|---|---|---|---|---|---|
| 0 | 0 | 1 | 1 | 1 | 1 | 0 | 1 | 0 | 0 | 1 | 1 | 1 | 1 | 1 | 0 | 0 | 0 | 0 | 0 | 0 | 0 | 0 | 0 | 0 |
| 0 | 0 | 1 | 1 | 1 | 0 | 0 | 1 | 1 | 1 | 1 | 1 | 1 | 1 | 1 | 1 | 1 | 1 | 1 | 0 | 0 | 0 | 1 | 0 | 1 |
| 0 | 0 | 0 | 0 | 1 | 1 | 0 | 1 | 1 | 1 | 1 | 1 | 1 | 1 | 1 | 1 | 0 | 1 | 0 | 0 | 0 | 1 | 1 | 0 | 2 |
| 0 | 0 | 1 | 0 | 1 | 1 | 0 | 1 | 1 | 1 | 1 | 1 | 1 | 1 | 1 | 1 | 1 | 0 | 1 | 0 | 0 | 1 | 0 | 1 | 3 |
| 0 | 0 | 0 | 0 | 1 | 1 | 1 | 1 | 1 | 1 | 1 | 1 | 1 | 1 | 1 | 1 | 1 | 1 | 1 | 0 | 0 | 0 | 1 | 0 | 4 |
| 1 | 0 | 0 | 0 | 0 | 1 | 1 | 1 | 1 | 1 | 1 | 1 | 1 | 1 | 1 | 1 | 1 | 1 | 1 | 0 | 0 | 0 | 1 | 0 | 5 |
| 0 | 0 | 1 | 1 | 1 | 1 | 1 | 1 | 1 | 0 | 0 | 1 | 0 | 0 | 0 | 0 | 0 | 0 | 1 | 0 | 1 | 1 | 1 | 0 | 6 |
| 0 | 0 | 1 | 1 | 1 | 1 | 1 | 1 | 1 | 0 | 0 | 1 | 0 | 1 | 1 | 0 | 1 | 1 | 1 | 0 | 1 | 0 | 0 | 0 | 7 |
| 0 | 0 | 1 | 1 | 1 | 1 | 0 | 1 | 1 | 0 | 0 | 1 | 0 | 1 | 1 | 1 | 1 | 0 | 1 | 1 | 0 | 0 | 0 | 0 | 8 |
| 0 | 0 | 1 | 1 | 1 | 1 | 0 | 1 | 1 | 1 | 0 | 1 | 1 | 1 | 1 | 1 | 1 | 0 | 1 | 0 | 1 | 1 | 0 | 0 | 9 |
| 0 | 0 | 1 | 1 | 1 | 1 | 0 | 1 | 1 | 1 | 0 | 1 | 1 | 1 | 1 | 1 | 1 | 0 | 0 | 0 | 1 | 1 | 0 | 0 | A |
| 0 | 0 | 1 | 1 | 1 | 1 | 0 | 0 | 1 | 1 | 0 | 1 | 1 | 1 | 1 | 1 | 1 | 1 | 1 | 0 | 1 | 1 | 0 | 0 | B |
| 0 | 1 | 1 | 1 | 1 | 1 | 0 | 1 | 1 | 0 | 0 | 1 | 1 | 1 | 1 | 0 | 0 | 1 | 1 | 1 | 0 | 0 | 0 | 1 | C |
| 0 | 0 | 1 | 1 | 1 | 0 | 0 | 1 | 1 | 1 | 0 | 1 | 1 | 1 | 1 | 1 | 1 | 1 | 1 | 0 | 0 | 0 | 1 | 0 | D |
| 0 | 0 | 1 | 1 | 0 | 1 | 1 | 1 | 1 | 0 | 0 | 1 | 1 | 1 | 1 | 1 | 1 | 1 | 1 | 0 | 1 | 1 | 1 | 1 | E |
| 0 | 0 | 1 | 1 | 0 | 1 | 1 | 1 | 1 | 1 | 0 | 1 | 1 | 1 | 1 | 1 | 1 | 1 | 1 | 0 | 1 | 1 | 0 | 0 | F |
| 0 | 0 | 1 | 1 | 1 | 1 | 0 | 0 | 1 | 1 | 0 | 1 | 1 | 1 | 1 | 0 | 1 | 1 | 1 | 0 | 1 | 1 | 0 | 0 | 10 |
| 0 | 0 | 1 | 1 | 1 | 1 | 0 | 1 | 0 | 0 | 0 | 1 | 1 | 1 | 1 | 1 | 0 | 0 | 0 | 1 | 0 | 0 | 0 | 1 | 11 |
| 0 | 0 | 1 | 1 | 1 | 1 | 0 | 1 | 1 | 0 | 0 | 1 | 0 | 1 | 1 | 1 | 1 | 0 | 1 | 1 | 1 | 0 | 0 | 0 | 12 |
| 0 | 0 | 1 | 1 | 1 | 0 | 0 | 1 | 1 | 1 | 0 | 1 | 1 | 0 | 0 | 0 | 1 | 1 | 1 | 1 | 0 | 1 | 0 | 0 | 13 |
| 0 | 0 | 1 | 0 | 1 | 1 | 0 | 1 | 1 | 1 | 0 | 1 | 1 | 1 | 1 | 1 | 1 | 0 | 1 | 1 | 1 | 0 | 0 | 1 | 14 |
| 1 | 0 | 1 | 1 | 1 | 1 | 0 | 1 | 1 | 1 | 0 | 1 | 1 | 1 | 1 | 1 | 1 | 0 | 0 | 1 | 1 | 0 | 1 | 0 | 15 |
| 0 | 0 | 1 | 1 | 1 | 1 | 0 | 1 | 1 | 1 | 0 | 1 | 1 | 1 | 1 | 1 | 1 | 1 | 1 | 1 | 0 | 1 | 0 | 0 | 16 |
| 0 | 0 | 1 | 0 | 1 | 1 | 1 | 0 | 1 | 1 | 0 | 1 | 1 | 1 | 1 | 0 | 0 | 1 | 0 | 1 | 1 | 0 | 1 | 0 | 17 |
| 0 | 0 | 1 | 1 | 1 | 1 | 0 | 1 | 1 | 1 | 0 | 1 | 1 | 1 | 1 | 1 | 1 | 1 | 1 | 0 | 1 | 1 | 1 | 1 | 18 |
| 0 | 0 | 1 | 1 | 1 | 1 | 0 | 0 | 1 | 1 | 0 | 1 | 1 | 1 | 1 | 0 | 1 | 1 | 1 | 1 | 0 | 1 | 1 | 0 | 19 |
| 0 | 1 | 1 | 1 | 1 | 1 | 0 | 1 | 1 | 1 | 0 | 1 | 1 | 1 | 1 | 1 | 0 | 1 | 1 | 0 | 0 | 0 | 0 | 0 | 1A |
| 0 | 0 | 1 | 1 | 1 | 1 | 0 | 1 | 1 | 0 | 0 | 1 | 1 | 1 | 1 | 1 | 1 | 1 | 1 | 0 | 0 | 0 | 1 | 0 | 1B |
| 0 | 0 | 1 | 1 | 1 | 1 | 0 | 1 | 1 | 0 | 0 | 1 | 0 | 0 | 0 | 1 | 1 | 1 | 1 | 0 | 1 | 1 | 1 | 1 | 1C |
|   |   |   |   |   |   |   |   |   |   |   |   |   |   |   |   |   |   |   |   |   |   |   |   | 1D |
|   |   |   |   |   |   |   |   |   |   |   |   |   |   |   |   |   |   |   |   |   |   |   |   | 1E |
|   |   |   |   |   |   |   |   |   |   |   |   |   |   |   |   |   |   |   |   |   |   |   |   | 1F |

Column groups:
- Columns F7–F0 (leftmost, group 27): INC CT, INC PIN, SLOT U/D, SLOT EN, RAM BIT, LD CT, RAM WR, FIRE EN
- Columns F7–F0 (middle, group 26): LOAD "gr", LD SLOT, MIL EN, SPARE, CNTR PRESET, FIRE
- Columns F7–F0 (rightmost, group 25): MUX CODE, JUMP ADDRESS

ONE MIL SEGMENT.

LOC 00  JUMP TO LOC '00' UNTIL 1/2 MIL IS SENSED.
        PRESET PIN COUNTER, LOAD SLOT COUNTER WITH 'E',
        ENABLE MIL CLOCK BIT

LOC 01  LOAD GENERAL PURPOSE COUNTER WITH 'F'
        ENABLE MIL CLOCK BIT

;THE FOLLOWING SHIFTS PIN FIRE OR DAMPING BITS DOWN ONE POSITION
;IN THE SIXTEEN BIT SHIFT REGISTER SELECTED BY THE PIN COUNTER.

LOC 02  IF LAST SLOT IS '1' JUMP TO LOC '06'.
        DECREMENT THE SLOT COUNTER.
        ENABLE MIL CLOCK BIT

LOC 03  IF RAM DATA IS '1' JUMP TO LOC '05'.
        INCREMENT THE SLOT COUNTER.
        ENABLE MIL CLOCK BIT

LOC 04  JUMP TO LOC '02'.
        LOAD RAM WITH '1', DECREMENT THE SLOT COUNTER.
        ENABLE MIL CLOCK BIT

LOC 05  JUMP TO LOC '02'.
        LOAD RAM WITH '1', DECREMENT THE SLOT COUNTER.
        INCREMENT THE GP COUNTER.
        ENABLE MIL CLOCK BIT

;THE FOLLOWING SEARCHES FOR A FIRE OR DAMPING BIT THAT
;WOULD TURN ON THE FIRE PULSE.

LOC 06  IF PIN DATA IS '1' JUMP TO LOC 'OE'.
        LOAD RAM (SLOT 'F') WITH '0', LOAD SLOT COUNTER WITH '0'

LOC 07  LOAD RAM WITH '0', LOAD SLOT COUNTER WITH '6'

LOC 08  IF RAM DATA IS '1' JUMP TO LOC '10'.
        LOAD SLOT COUNTER WITH '7'

LOC 09  IF RAM DATA IS '1' JUMP TO LOC 'OC'.

LOC 0A  IF LAST COUNT (GEN PURPOSE COUNTER) IS '1' JUMP TO LOC 'OC'.

LOC 0B  LOAD FIRE REGISTER WITH '1'

;THE FOLLOWING EXITS IF ALL PINS HAVE BEEN PROCESSED, ELSE
;THE NEXT PIN AND SHIFT REGISTER IS SELECTED.

LOC 0C  IF LAST PIN (PIN COUNTER) IS '1' JUMP TO LOC '11'.
        INCREMENT THE PIN COUNTER, LOAD SLOT COUNTER WITH 'E'

LOC 0D  JUMP TO LOC '02'.
        LOAD GP COUNTER WITH 'F'

;THE FOLLOWING SETS THE 'NEW FIRE' BIT IN SLOT 'F' AND TURNS
;OF ANY FIRE OR DAMPING PULSES IN THE FIRE REGISTER.

LOC 0E  LOAD RAM (SLOT '0') WITH '1', LOAD SLOT COUNTER WITH 'F'

LOC 0F  JUMP TO LOC 'OC'.
        LOAD RAM WITH '1', LOAD FIRE REGISTER WITH '0'

*Fig. 6A*

HALF MIL SEGMENT.

LOC 11  JUMP TO LOC 11 UNTIL 1/2 MIL IS SENSED.
        PRESET PIN COUNTER. LOAD SLOT COUNTER WITH 'F'

LOC 12  IF RAM DATA ('NEW FIRE' BIT) IS '1' JUMP TO LOC '1C'.
        LOAD SLOT COUNTER WITH '7'

LOC 13  LOAD GENERAL PURPOSE COUNTER WITH '8'

;THE FOLLOWING SEARCHES FOR A DAMPING BIT THAT WOULD
; CAUSE A DAMPING PULSE TO BE TURNED OFF.

LOC 14  IF RAM DATA IS '1' JUMP TO LOC '19'.
        INCREMENT SLOT COUNTER

LOC 15  IF LAST COUNT IS '1' JUMP TO LOC '1A'.
        INCREMENT GP COUNTER

LOC 16  JUMP TO LOC '14'.

;THE FOLLOWING CLEARS THE SHIFT REGISTER
;FROM SLOT '1' THRU SLOT 'F'.

LOC 1C  JUMP TO LOC '17'.
        LOAD SLOT COUNTER WITH '1'

LOC 17  IF LAST SLOT IS '1' JUMP TO LOC '1A'
        LOAD RAM WITH '0', LOAD FIRE REGISTER WITH '0',
        INCREMENT THE SLOT COUNTER

LOC 18  JUMP TO LOC '17'.

;THE NEXT INSTRUCTION TURNS OFF A DAMPING PULSE.

LOC 19  JUMP TO LOC '1A'.
        LOAD FIRE REG WITH '0'

;THE FOLLOWING EXITS IF ALL PINS HAVE BEEN PROCESSED, ELSE
;THE NEXT PIN AND SHIFT REGISTER ARE SELECTED.

LOC 1A  IF LAST PIN IS '1' JUMP TO LOC '00'.
        INCREMENT PIN COUNTER

LOC 1B  JUMP TO LOC '12'.
        LOAD SLOT COUNTER WITH 'F'

*Fig. 6B*

PRINTER PIN CONTROL CIRCUITRY

BACKGROUND OF THE INVENTION

The present invention relates to high speed pin printers and more particularly to pin control circuitry adapted for use in a high quality printer in which input data words, used to initiate pin actuations, are presented at a rate much faster than successive possible operations of any single pin, the purpose of the high data rate being to provide a lateral resolution of pin strikes which is even finer than the nominal diameter of the dot produced by each pin strike.

The function of the apparatus of the present invention is to respond to any fire bit present in each briefly presented input data word by generating a complex waveform of relatively long overall duration. The particular waveform generated has an energizing portion which effects the pin strike and a damping portion which aids the pin in coming to rest without undue oscillatory rebounding. The damping portion typically comprises a series of relatively brief pulses. To facilitate high speed operation in which successive pin strikes may be produced at minimum separation, the damping sequence is modified by shortening the series as a function of the timing of closely successive fire bits for a given pin.

Among the several objects of the present invention may be noted the provision of pin control circuitry for selectively energizing and then damping the rebound of the several pins employed in a multiple pin print head, in response to data words representing pin firing patterns; the provision of such apparatus in which data words may be presented at a rate faster than the possible repetitive firing of a given pin; the provision of such a system in which pins are fired with lateral resolution finer than the nominal diameter of the dot produced by the actuation of a single pin; the provision of such circuitry which is adaptable for widely varying pin fire repetition intervals; and the provision of such apparatus which is highly reliable and which is of relatively simple and inexpensive construction.

SUMMARY OF THE INVENTION

Briefly, apparatus according to the present invention is useful for effecting high speed actuation and damping of the print pins in a multiple pin print head responsive to data words representing pin fire patterns. A high speed driver circuit is provided for each pin. Means are included for generating, for each pin, a firing signal which comprises a relatively long pulse of predetermined duration, initiated by a respective fire bit, followed by a series of relatively short pulses. Means are further provided for reducing the number of short pulses in this series when a successive fire bit for the same pin is received in the interval between the end of the long pulse and the completion of the series of short pulses, the extent of the shortening being a predetermined function of the actual timing of the successive fire bit relative to its predecessor.

In accordance with one aspect of the present invention, the signal generating means comprises a special purpose, highspeed digital processor operating on a stored program. A random access memory is employed in conjunction with the processor, the memory being operated as a plurality of digital equivalent shift registers, one for each pin. The shift registers are employed to store a representation of the history of requested actuations for that pin. During successive clock intervals, the processor examines these histories to determine the proper value for the respective output signal at that point in time, in accordance with the stored program.

BRIEF DESCRIPTION OF THE DRAWINGS

FIG. 4 is a chart representing the binary programs stored in a read only memory utilized in the FIG. 1 apparatus;

FIGS. 6A and 6B are tables representing the operations effected by each word of the program stored in the read only memory.

Corresponding reference characters indicate corresponding parts throughout the several views of the drawings.

DESCRIPTION OF THE PREFERRED EMBODIMENT

The print pin control circuitry disclosed in the present specification is adapted for use in a high quality pin printer of the type disclosed in copending application Ser. No. 811,991 filed June 30, 1977, now U.S. Pat. No. 4,159,882, and represents an improvement of the pin control circuitry described in that application. As described in that application, it has been found that high quality printing, i.e. printing of so-called letter quality, may be obtained using a multiple pin print head of the type commonly employed for matrix printing, if interlaced scanning of the print head is provided and if the lateral placement of pin strikes is controlled with a resolution which is essentially in order of magnitude finer than the nominal diameter of the dot produced by each pin strike.

To obtain such resolution, data words representing pin firing patterns are generated by a microprocessor system which employs font defining stored data. These data words are presented to the pin driving circuitry at a rate which is much faster than the fastest possible successive operations of any one pin. Each data word is thus presented only for a period which is relatively brief as compared even with the energizing pulse required to effect actuation of a given pin. Typically, the data word comprises one bit position for each pin, the occurrence of a fire bit, typically a binary "one", at that position, being the signal to initiate the actuation of the respective print pin. Thus, in the first instance it is necessary to generate an actuating pulse having a duration which is substantially longer than the interval between successive data words. Assuming a conventional seven pin print head, as is the case with the printer described in the earlier copending application, each data word comprises seven bit positions.

It has also been found highly advantageous to provide a further and supplement waveform to effect electrical damping of the pin's movement following actuation. The presently preferred supplemental waveform is a succession of relatively short pulses following the initial, relatively long, energizing pulse. This series of short pulses, occurring after the impression-making pin strike, tends to slow and dampen the return velocity of the pin, thereby preventing a further rebound which might otherwise occasion a second contact with the paper, creating a smeared image.

As described in the earlier copending application Ser. No. 811,991, lateral placement of pin strikes is controlled with a resolution of about one mil even though the nominal diameter of the dot made by each pin strike is about 10 mils. With a lateral head travel of about 12 inches per second, one mil of travel corresponds to about 83 microseconds. This period, which constitutes a basic timing interval within the printer system, is conveniently referred to as the "miltime" period. Correspondingly, data words representing pin fire patterns are presented once each miltime, i.e. once each 83 microseconds. These values are similar to though not exactly the same as those given in the earlier copending application, the exact parameters of the printer design having evolved slightly in the interim.

The waveform generated by the apparatus of the present invention to provide actuation and damping waveform for a single isolated pin strike is illustrated in FIG. 3A. As described previously, it may be understood that this waveform is initiated by the occurrence of a fire bit in the respective bit position in a single data word. The waveform illustrated in FIG. 3A comprises a relatively long energizing pulse, i.e. a pulse having a duration of 5 miltimes—about 416 microseconds, followed by 7 shorter pulses, each of which is one-half miltime long—about 42 microseconds. The series follows the long pulse by two miltimes and the interval between pulses in the series is one-half miltime.

While the overall waveform illustrated in FIG. 3A is suitable for producing a single, isolated pin strike, it has been found useful to modify this waveform to facilitate successive operations of the same pin at short intervals, i.e. to obtain the maximum possible repetition rate for a given pin. In accordance with another aspect of the present invention, the number of short pulses in the series following the relatively long energizing pulse is reduced when a successive fire bit for the same pin is received in the interval between the long pulse and the completion of the series of short pulses. Further, the extent of the shortening is controlled as a predetermined function of the actual timing of the successive fire bit. The manner in which this reduction in the series is accomplished is illustrated in FIGS. 3B through 3I. If a successive fire bit is received fifteen or more miltimes after a previous fire bit, no shortening of the damping series is effected but rather the next relatively long energizing pulse is generated just as the previous energizing pulse was. This is illustrated in FIG. 3B. If, however, the next fire bit is only fourteen miltimes after the preceding, one of the short pulses is dropped as illustrated in FIG. 3C. For each additional miltime by which the successive fire bit is advanced with respect to the preceding fire bit, one further short pulse is dropped from the damping sequence. This continues right up until the successive fire bit occurs only eight miltimes after the preceding fire bit at which point no damping pulses are generated, i.e. as illustrated in FIG. 3I. With this timing, the pin is being operated at its fastest repetition rate, i.e. re-striking after about a 666 microsecond interval, and will produce overlapping dots.

Figure 1:
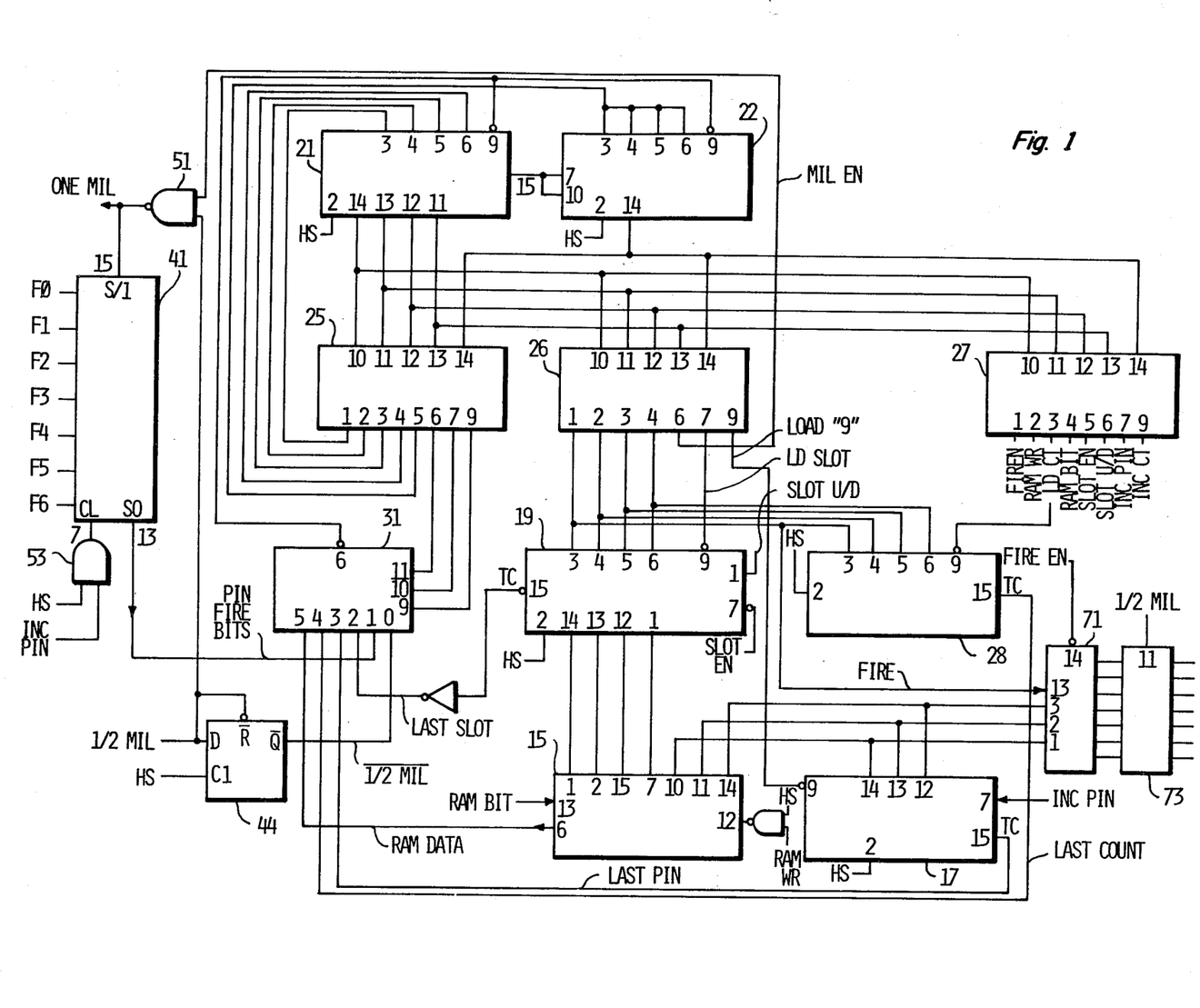
FIG. 1 is a schematic block diagram of data word controlled signal generating means operating in accordance with the present invention and incorporating a special purpose high speed digital processor.
Figure 3:
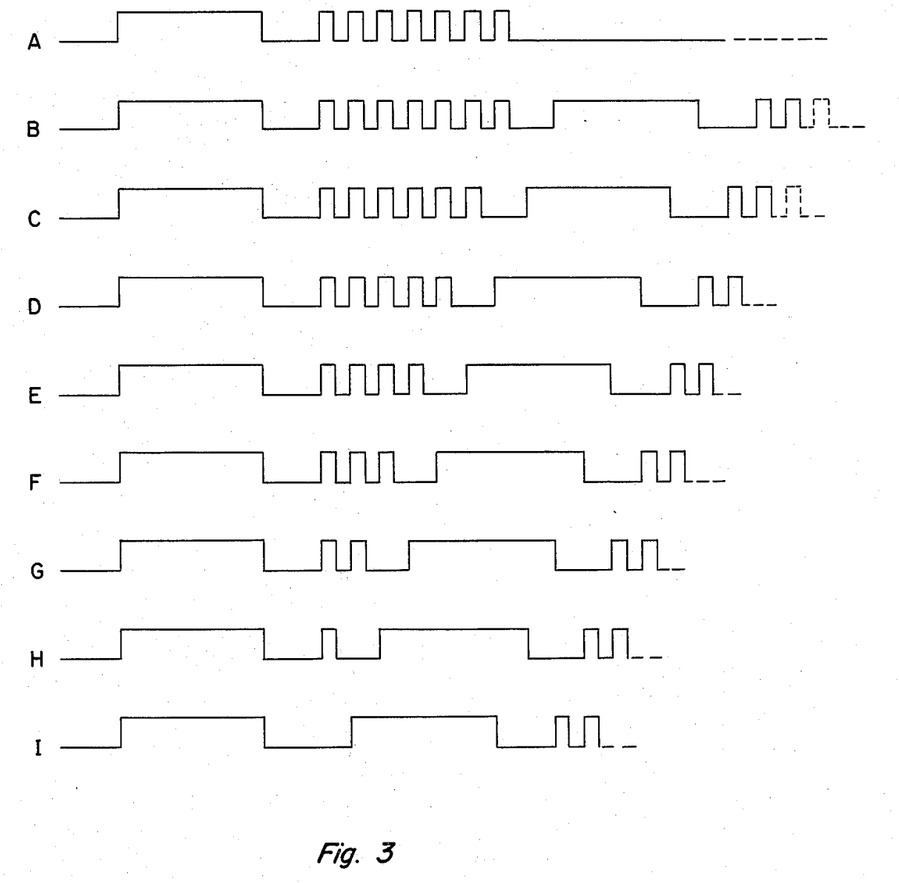
FIGS. 3A–3I are diagrams of signal waveforms generated by the FIG. 1 apparatus in response to data words calling for the actuation of a given pin at successively closer spacings.

To generate the waveforms illustrated in FIG. 3 under the various conditions specified, the apparatus of FIG. 1 keeps a history for each pin in a digital memory. In the FIG. 1 circuitry this memory is a high speed random access memory (RAM), designated by reference character 15. In the embodiment illustrated, RAM 15 is a 256-bit by 1-bit memory device but is operated as the digital equivalent of seven shift registers each having 16 bit positions or slots, there being one such digitally equivalent shift register for each of the seven pins in the print head. In this connection, three of the address bits to the RAM 15 are provided by a pin counter 17 and the remaining four address bits are provided by a counter 19 which is designated the slot counter, i.e. the counter that designates a particular position within each digitally equivalent shift register. As will be apparent hereinafter, each slot corresponds to a unit of time in the history of actuation requests for the respective pin.

The memory device 15 is examined and controlled by a special purpose, stored program digital processor which is implemented in hardwired logic. The processor comprises an address counter, implemented by devices 21 and 22, a read-only memory, implemented by devices 25, 26, and 27, and a multiplexer, device 31. A separate programable counter 28 is also provided to permit some general purpose flexibility in micro-coding the processor. The integrated circuit devices which implement the various counters, memories and other functional component blocks in the FIG. 1 system are identified more particularly in the following table. As an aid in interpreting details in the FIG. 1 circuit diagram, pim members have been included in appropriate cases, corresponding with the integrated circuits idenfified.

| Reference Character | Device Type | Source |
|---|---|---|
| 15 | 27 LS 00 | AMD |
| 17, 21, 22 & 28 | 74 S 163 | T.I. |
| 19 | 74 S 169 | T.I. |
| 25, 26 & 27 | 74 LS 288 | T.I. |
| 31 | 74 LS 251 | T.I. |
| 71 | 74 259 | T.I. |
| 73 | 74 273 | T.I. |
| 76 | 74 LS 244 | T.I. |
| 41 | 74 LS 166 | T.I. |

The address counter provides address signals to the read only memory which holds the microcoded program store for the processor. The read only memory is organized to provide 32 words of 24-bits each and the address counter devices 21 and 22 are interconnected to provide a 32-state (5-bit) counter. The address counter devices are presettable to facilitate program branching. For this purpose, the first five bits of each word read out from the ROM 25 are provided back to the counter 21. Whether or not the counter devices are preset in response to these signals, however, is controlled by the output signal from the multiplexer 31. Various input signals are provided to the multiplexer, as described hereinafter, and a given one of these is designated by means of signals constituted by three further bits of the word being read out of the ROM. The address counter devices 21 and 22 are incremented by a high speed clock signal designated HS. In the embodiment illustrated, the high speed clock has a frequency of 10 MHz. This then is the basic rate at which the contents of the ROM are cycled through, although the contents will not typically be cycled through sequentially since the words being read out of the ROM will cause conditional branching and looping as determined by the multiplexer 31.

The binary microcode which constitutes the presently preferred operating system for the high speed processor is represented in FIG. 4. The table of FIG. 4 comprises a 24-wide by 32-deep matrix, the binary value being stored in each memory cell being indicated by a "0" or a "1". Hexadecimal addresses are indicated down the right side of the table while the breakdown of the 24-bit contents into the 8-bit groups provided by each of the integrated circuit devices 25, 26, and 27 is indicated on the bottom of the chart. In this particular embodiment, only 29 of the 32 available microcode words were used. The general function of each bit position is indicated at the top of the table. One of the available control signal bit positions, i.e. output F4 from device 26, was not required in this particular embodiment and was left set. In comparing FIGS. 1 and 4, it should be noted that the circuit layout is reversed from the microcoded representation, that is, the jump address is on the right side of the FIG. 4 microcode representation whereas the signals forming the jump address are shown as coming from the lefthand portion of the leftmost ROM integrated circuit 25 in FIG. 1.

In addition to providing branch addresses and certain counter preset values as described hereinafter, the microcode words read out of the read only memory provide various control signals. While various of the functions provided by these control signals are described elsewhere in greater detail, a summary description is as follows.

INC CT—This signal causes the programmable counter 28 to be incremented.

INC PIN—This signal causes the pin counter 17 to be incremented.

SLOT U/D—This signal controls whether the slot counter 19, which is reversible, counts in the up or down direction.

SLOT EN—This signal selectively enables the slot counter 19 so that it can be advanced or decremented by the high speed clock signal H-S.

RAM BIT—This signal represents data which can be read into the random access memory 15. Bits in this position, in general, are generated in response to the detection of fire bits, i.e. pin strike requests, in the data word though not coincidently in time therewith.

LD CT—This signal causes the programmable counter to acquire the value applied to its preset input terminals. This latter value is derived from other bit positions in the microcode.

RAM WR—This signal, after synchronization with the high speed clock in a NAND gate 34, enables writing of data into the random access memory 15.

FIRE EN—This signal enables the addressable latch 71 which then stores and demultiplexes the decision results generated by the processor.

LD "9"—This signal control presetting of the pin counter, the value permanently being applied to the preset inputs of this counter corresponding to the value "9".

LD SLOT—This signal causes the slot counter 19 to be loaded with the value applied to those preset input terminals, this value being determined by other bits in the microcode.

MIL EN—This signal controls passage of the half mil time signal through a NAND gate 51. The microcoding effects a divide-by-two operation in the half miltime signal to generate a miltime signal which is utilized for strobing in data words representing pin fire requests and for facilitating synchronization between the pin control circuitry in the main printer control microprocessor.

SPARE—This signal is unused in the particular embodiment illustrated.

FIRE—This signal is the output signal from the result of the logical process and determines whether the waveform for the pin then being examined should be high or low at that time. This data is de-multiplexed to obtain a parallel control word for operating the several high speed pin-driving circuits by means of addressable latch 71.

To permit the program to selectively examine any given bit position or slot within one of the digitally equivalent shift registers, the slot counter 19 may be preloaded by signals constituting the next four bits in a word being read out of the read only memory. A fifth bit in the word, designated the LD SLT signal, is used to effect presetting to this value. When enabled, slot counter 19 is advanced by the high speed clock signal, designated HS. Count enabling is effected by another bit in the word being read out of the ROM memory, this signal being designated SLOT EN. Other control signals provided by the device 27 portion of the read only memory include COUNTER INCREMENT which serves to advance the programmable counter 28. A pin counter increment signal is also provided for advancing the pin counter 17. This signal is also used elsewhere in manipulating data words as described hereinafter. A signal designated SLOT UP/DOWN is provided for controlling the direction of incrementing of slot counter IC19 as is the slot counter enable signal as mentioned previously. Another bit position in each word being read out of the ROM memory is designated ROM DATA BIT and this signal is provided as an input to the memory device 15 so that bits can be read into this memory device to represent fire requests. A programmable counter load signal is provided for selectively presetting the programmable counter 28. Values to which this counter can be set are derived from the same data lines as are used for presetting slot counter 19. The slot counter, the pin counter, and the programmable counter each provide a terminal count (TC) output signal and these signals are provided as selectable inputs to the multiplexer 31. In order to have the terminal count signal for the pin counter 17 correspond with the last pin in the pin head and hence also with the last of the seven digital equivalent shift registers, the pin counter can be preset to a count of nine. For this purpose, the preset value applied to this counter is permanently wired to correspond to a binary nine and the selective loading of this value is effected by one of the control signals obtained from the ROM, this signal being designated LOAD NINE.

As explained in greater detail hereinafter, the high speed digital processor examines in sequential order the several shift registers which store the firing history for each pin. In order to obtain new fire pin information in similarly sequential order, a parallel data word representing pin fire information is serialized by means of a parallel in/serial out shift register 41. As explained in greater detail in the copending application Ser. No. 811,991, data words representing pin fire data are transferred from the main microprocessor through a suitable parallel input/output device, e.g. a Zilog Z80 PIO. The several bits of the data word representing a pin fire pattern, signals FO-F6, are presented in parallel to the serializing device 41. Strobing of this data into the device is effected under program control syncronized with timing signals obtained from the main microprocessor system.

The main microprocessor controller also sets up a programmable timer, such as the Zilog Z80 CTC, to provide timing signals corresponding to the lateral traverse of the print head. In the particular embodiment illustrated, the timing signal from the main microprocessor to the print head control circuitry being designated HALF MIL. In addition to its use in synchronizing transfers of data words between the main microprocessor system and the pin firing circuitry, this signal is provided as one of the inputs to the multiplexer 31 which controls branching of the microcoded program.

As indicated in the drawing of FIG. 1, one bit of each word being read out from the read only memory constitutes a signal designated MIL TIME ENABLE BIT. This signal is combined in a NAND gate 51 with the HALF MIL signal to obtain a signal designated ONE MIL which is used to strobe parallel data from the Z80 PIO into the parallel in/series out shift register IC41. The microcoding of the program in the ROM is such that an effective divide-by-two operation is obtained as well as a synchronization of the pin control circuitry with the main microprocessor system. The ONE MIL signal is provided back to the main microprocessor to aid in the synchronization.

Clocking of data serially out of shift register 41 is done at the high speed clock rate, this clock signal being selectively passed through AND gate 53 under control of the control signal designated INC PIN described previously and being one of the control signals available from the read only memory. The serial signal stream out is designated PIN FIRE BITS and is provided as an input to the multiplexer 31. This input thus allows the microcoded program to test whether a fire bit is indeed present for any given pin as each data word is serialized and read out.

As indicated previously, the multiplexer 31 allows the microcoded stored program to test various parameters and to branch responsive to the results of the test. For this purpose, three of the bits in each word being read out of the read only memory are provided as a selection code to the multiplexer. The effect of the different selection codes is as follows.

| Code  | Function Being Tested           |
|-------|---------------------------------|
| 1 1 1 | None (Absolute jump)            |
| 1 1 0 | None (Continue in sequence)     |
| 1 0 1 | Ram Data (from device 15)       |
| 1 0 0 | Last Count (TC, device 28)      |
| 0 1 1 | Last Pin (TC, device 17)        |
| 0 1 0 | Last Slot (TC, device 19)       |
| 0 0 1 | Pin Data                        |
| 0 0 0 | Half Mil (clock synchronization)|

As indicated previously, the high speed processor examines the history representing contents of each digital equivalent shift register to determine whether the respective pin control winding should, at that instant, be energized or deenergized to obtain the desired waveform based on the history of the pin fire requests. The result of the program decision is reflected in one bit position in the word being read out of the ROM. In the embodiment illustrated, this bit position is the same as the least significant bit of the address being provided to the slot counter 19. Since at the time of writing out of data, it is never necessary to load the slot counter at the same time, these signals can, in effect be multiplexed.

The data bit representing the result of the program determination for a given pin is written into an addressable latch 71, being applied to the data (D) input of the latch device. Addressing of the latch is controlled by the pin counter 17 in synchronism with the addressing of the digital equivalent shift registers in the RAM 15. Accordingly, upon completion of the examination of each shift register, a bit read out to the addressable latch will be put into a location corresponding to the respective pin. Likewise, as the stored program goes through the seven iterations of this procedure, seven latch positions within the addressable latch 71 will be correspondingly set. The reading in of data into the addressable latch is controlled by one of the ROM-generated control signals described previously, designated PIN FIRE ENABLE.

As will be understood by those skilled in the art, the bit-by-bit entering of data into the addressable latch means that transitions corresponding to different pins would be skewed in time if the pin driving circuits were controlled directly by the parallel output signals provided from the addressable latch. To obtain synchronization of all the transitions, these signals levels are transferred to a buffer latch 73 which is updated each half mil time. Signals from the buffer latch are then applied through suitable drivers to power circuits energizing the pin control windings.

Figure 5A:
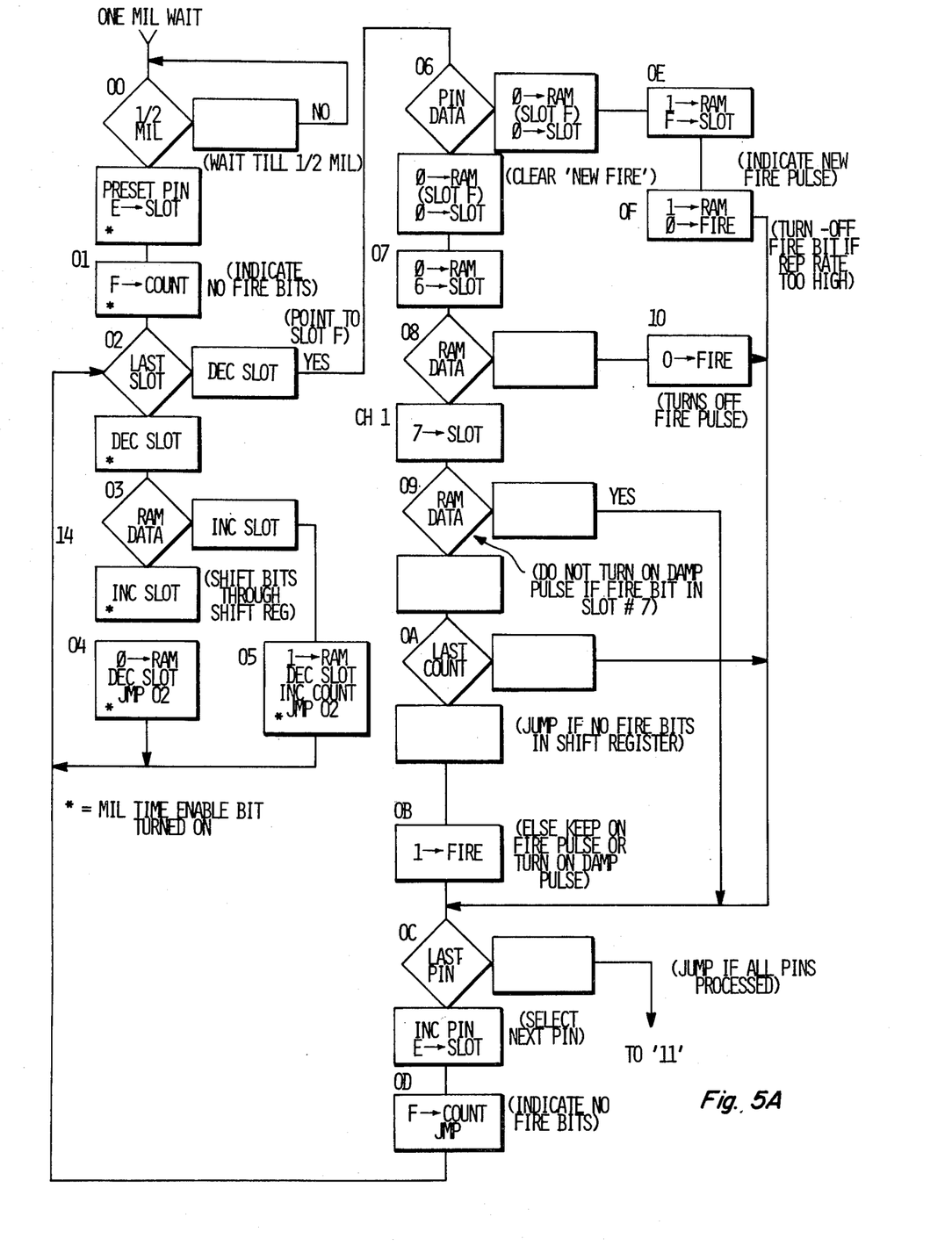
FIGS. 5A and 5B are flow charts representing the sequences of operations followed by the processor of the FIG. 1 apparatus in response to the program illustrated in FIG. 5.
Figure 5B:
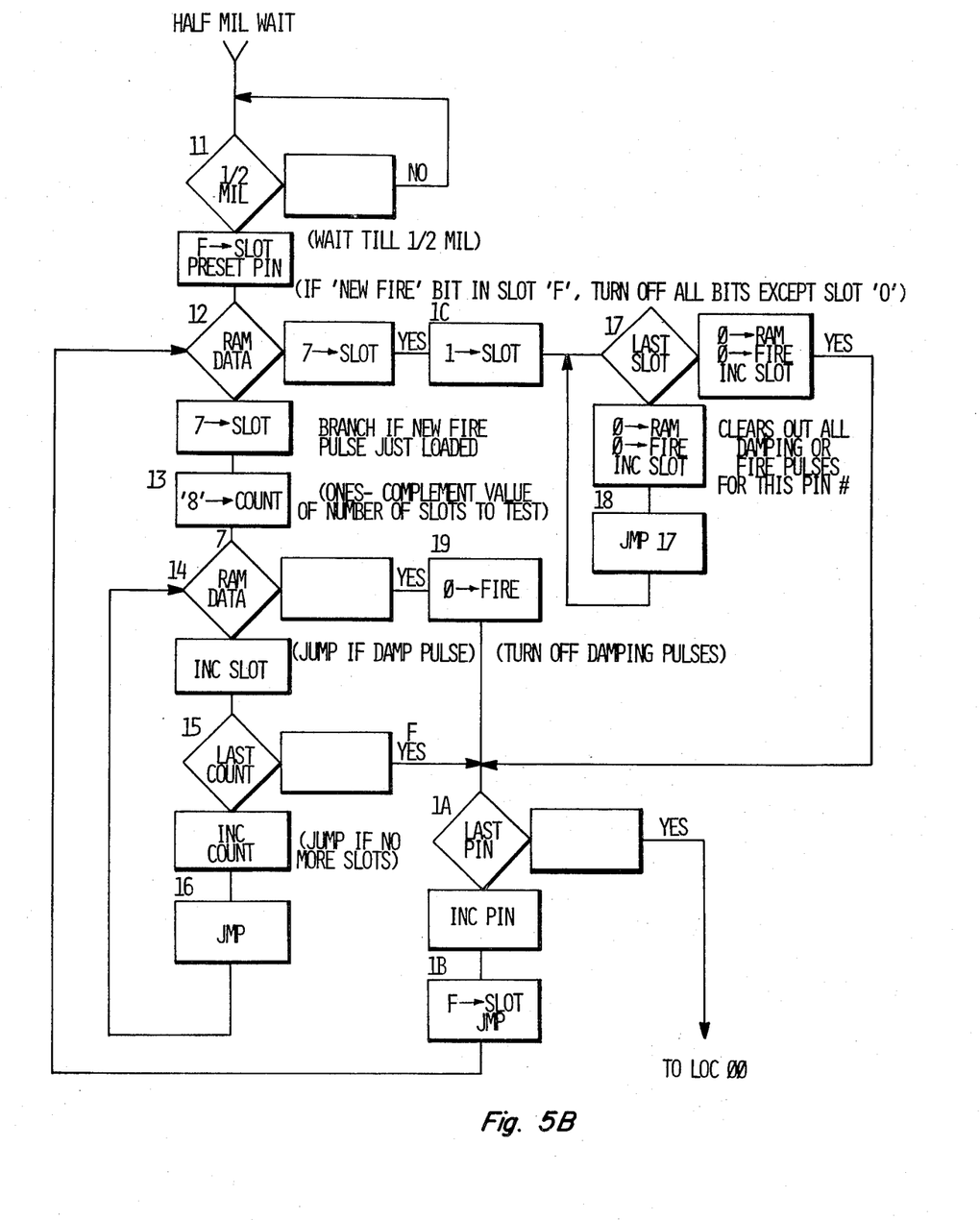

The sequence of operations performed by the high speed processor may, in general, be broken into two portions, each of which occurs in a respective half mil time interval. The flow charts for these two program portions or segments are illustrated in FIGS. 4A and 4B. The first program segment is that which updates the information stored in the seven digital equivalent shift registers. This procedure involves serially reading out and testing for fire bits in the new data word which has in the meantime been transferred into the parallel in/series out shift register 41. As the read out from the shift register is provided as one of the inputs to the multiplexer 31, it can be seen that the microcoded program can test for the presence of such information. Likewise, since one of the bits in the word being read out of the read only memory is used as the input signal for the random access memory 15, information can be written into this memory to reflect, in desired fashion, the history of pin fire requests for each pin. In addition to reading in new data, this segment or portion of the microcoded program causes previously written information to be shifted along the respective shift registers so that each portion then resides in the appropriate slot to properly reflect history during the next mil time examination of the shift register contents. Again, seven iterations of this procedure are performed, one for each of the print head pins.

Figure 6B:
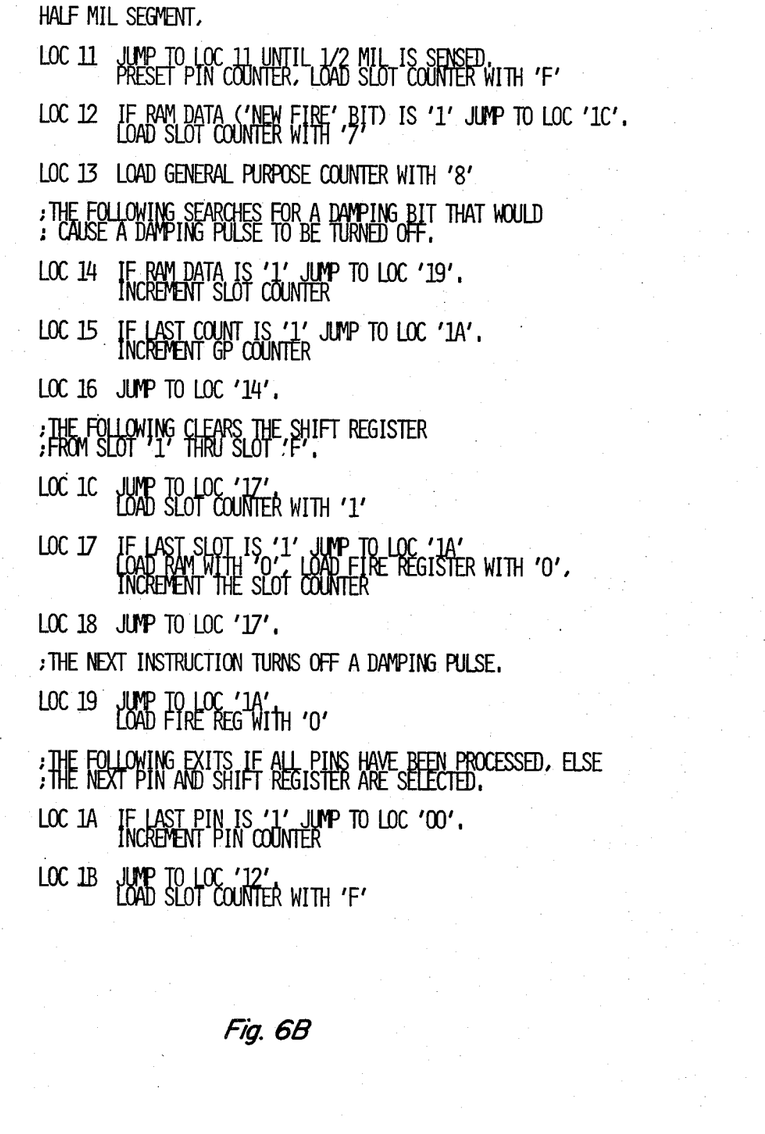

During the second segment, the processor examines the contents of each of the shift registers and generates the appropriate output signal level for the pin driver, taking into consideration when past requests for the actuation of that pin were received, as reflected in the stored history. The examination of the contents of each digitally equivalent shift register involves the examination of the various slot segments, each of which represents a time interval in the history of a request for that pin. Seven iterations of this slot searching sequence are performed, one for each of the pins. When the iteration for the last pin is complete, the second program segment is completed and the program proceeds back to the first portion or segment. The details of the decision logic are set forth in the flow chart. As the annotation on the flow chart itself, however, is necessarily somewhat sparse, a more detailed explanation of the operation provided at each memory location is provided in the chart of FIGS. 6A and 6B. It will be understood that both the flow chart and the FIG. 6 chart are in actuality explanations of the operations which necessarily flow from or are defined by the microcode illustrated in FIG. 4.

Each program segment occurs in a respective half mil time interval. Thus, the processor must necessarily run at relatively high speed, a ten-megacycle clock rate in the embodiment illustrated, and is, in accordance with the present invention, configured as a special-purpose processor hardwired to perform the particular function needed. The architecture is thus distinguishable from a general purpose processor which could not as efficiently perform the same function. The use of a microcoded stored microprocessor does permit some flexibility in the adjustment of the detailed parameters of the operation in a way which would be relatively difficult with a fully hardwired system, e.g. one employing multivibrators and the like, for generating timing signals. Likewise, in a fully hardwired system, whether analog or digital, it would be difficult to implement the variable waveform provided by the present invention which accommodates for various sequential timing in successive actuations of the same pin.

Figure 2:
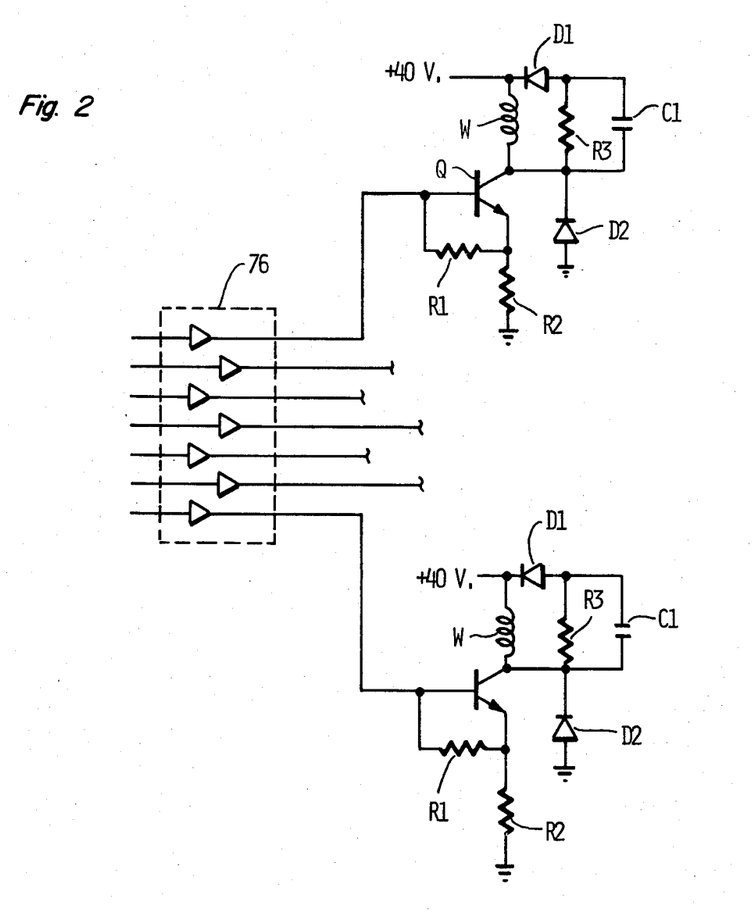
FIG. 2 is a circuit diagram of high speed pin-driving circuitry adapted to be driven by signals generated by the circuit of FIG. 1.

The signals generated by the apparatus of FIG. 1 are applied to the individual pin-actuating windings in the print head by means of high speed driver circuitry as illustrated in FIG. 2. While only two such driver circuits are shown in detail, it will be understood that seven such circuits are utilized, one for each of the pins in the seven-pin print head used in the preferred embodiment being described. The particular head employed is assumed to be that manufactured by Practical Automation, Inc. of Shelton, Connecticut, as described in the previously reference copending application Ser. No. 811,991.

Referring now to FIG. 2, the energization of each pin winding, designated W, is controlled by an NPN transistor Q which is in turn driven by an integrated circuit buffer driver 76. Biasing of transistor Q is provided by resistors R1 and R2. To assist in damping the rebound energy of the pin and to facilitate the interaction of the complex waveform generated by the circuitry of FIG. 1, the pin-energizing winding W is shunted by a damping network comprising a capacitor C1 and a resistor R3 in parallel, this pair of components being in series with a blocking diode D1 which connects to the supply side of the winding W. The junction between the winding and the collector of transistor Q is clipped by a kickback diode D2 going to ground. Typical values for the damping components are as follows:

| | |
|---|---|
| R1 | 130 ohms |
| R2 | 2 ohms |
| R3 | 2200 ohms |

| -continued | |
|---|---|
| C1 | 0.5 microfarads |

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a printer system employing a multiple pin print head in which pin firings are initiated by the generation of data words at a clock rate substantially faster than possible repetitive firings of a single pin, each such word comprising a plurality of data bits each corresponding to a respective pin, the occurrence of a fire bit at any data bit position in the data word being a signal to initiate an operation of the respective pin; apparatus for effecting high speed actuation and damping of the pins in response to such data words, said apparatus comprising:

for each pin, a high speed driver circuit;
means for generating, for each pin, a firing signal which comprises a long pulse of predetermined duration, initiated by a respective fire bit, followed by a series of short pulses;
means for applying each firing signal to the respective driver circuit; and
means for reducing the number of short pulses in the series when a successive fire bit for the same pin is received in a predetermined interval following the long pulse, the extent of shortening being a predetermined progressive function of the actual timing of said successive fire bit.

2. Apparatus as set forth in claim 1 in which a history of fire requests for each pin is stored in a digital equivalent shift register.

3. Apparatus as set forth in claim 2 in which the state of firing signal for each pin is determined by examining the contents of the respective shift register.

4. Apparatus as set forth in claim 3 in which the contents of a shift register are adjusted in response to the arrival of a fire bit for the respective pin before the completion of the series of short pulses for a previous actuation.

5. Apparatus as set forth in claim 3 including a special purpose, stored program digital processor for examining the shift register contents.

6. In a printer system employing a multiple pin print head in which pin firings are initiated by the generation of data words at a clock rate substantially faster than possible repetitive firings of a single pin, each such word comprising a plurality of data bits each corresponding to a respective pin, the occurrence of a fire bit at any data bit position in the data word being a signal to initiate an operation of the respective pin; apparatus for effecting high speed actuation and damping of the pins in response to such data words, said apparatus comprising:

for each pin, a high speed driver circuit;
means for generating, for each pin, a firing signal which comprises a long pulse of predetermined duration, initiated by a respective fire bit, followed by a series of short pulses; and means for reducing the number of short pulses in the series when a successive fire bit for the same pin is received in the interval between the end of the long pulse and the completion of the series of short pulses, the extent of shortening being a predetermined function of the actual timing of said successive fire bit, which function maintains a preselected interval between the last short pulse and the next long pulse.

7. In a printer system employing a multiple-pin print head in which pin firings are initiated by the generation of input words at a clock rate substantially faster than possible repetitive firings of a single pin, each such input word comprising a plurality of data bits each corresponding to a respective pin, the occurrence of a fire bit at any data bit position in the input word being a signal to initiate an operation of the respective pin; apparatus for effecting high speed actuation and damping of the pins in response to such data words, said apparatus comprising:

for each pin, a high speed driver circuit;
a read only memory holding a succession of binary program words;
a presettable counter for addressing said read only memory;
means for applying a first portion of a program word being read out of said read only memory to the preset value inputs of said address counter as a possible next address;
multiplex means controlled by a second portion of a word being read out of said read only memory for selecting one of a plurality of condition parameters;
means for enabling the presetting of said counter as a function of the state of the selected condition parameter;
means for serializing each input word to provide the data bits sequentially, the data bits being provided to said multiplex means as one condition parameter;
a pin counter for designating a pin position being considered, at least one state of said pin counter being operative to provide a signal to said multiplex means as a condition parameter;
a slot counter for designating a time interval relative to the prior history of pin actuation, at least one state of said slot counter being operative to provide a signal to said multiplex means as a condition parameter;
a random access memory addressed by values obtained from said pin counter and said slot counter;
means for writing record bits into said memory in response to portions of a word being read out of said read only memory, the program word sequence being operative to effect writing in response to data bits being read out of said serializing means, a record bit read out of said random access memory being thereby related to the prior history of pin actuation;
an addressable latch also addressed by said pin counter into which fire bits are selectively written in response to a further portion of a word being read out of said read only memory;
a buffer latch; and
means for synchronously transferring, out of said addressable latch and into said buffer latch, a data word representing the desired current state of energization of each of said pin drivers, each bit of said data word being applied to a respective one of said pin driver circuits as a control signal.

* * * * *